Patented Dec. 21, 1943

2,337,083

UNITED STATES PATENT OFFICE 2,337,083

FERROUS ALLOY

Arthur T. Cape, Santa Cruz, Calif., assignor to Coast Metals, Inc., Canton, Ohio, a corporation of Ohio No Drawing. Application July 14, 1942, Serial No. 450,915

9 Claims. (Cl. 75—128)

This invention relates generally to ferrous alloys, but has reference more particularly to an alloy which is particularly adapted for use in the form of weld rods for hard facing purposes.

A primary object of the invention is to provide a weld rod for this purpose which may be used for hard facing various articles which have been subjected to wear and abrasion, but which is especially adapted for hard facing hot shears, hot working dies, cold forming dies, and the like.

The weld rod derives its usefulness from the fact that it is formed of a ferrous alloy which not only has high resistance to wear and abrasion, but has high resistance, as well, to heavy and repeated impacts, that is to say, it possesses high mechanical strength. It is also resistant to chemical corrosion and to oxidation at high temperatures, retains its mechanical strength at high temperatures, has the quality of being capable of forming a sound bond with the base metal, has a high viscosity in the molten condition, such as to permit exceedingly easy application thereof to the base metal, and is further characterized by the fact that its hardness decreases with increasing carbon content, varying from about 60 to about 40 Rockwell C in the "as-cast" state.

The weld rod is preferably made from a ferrous alloy containing from about .30 to about 1.50% carbon, chromium and nickel in amounts of from about 2% to about 7% of each, from about 5% to about 10% molybdenum, and, if desired, boron in effective amounts up to about 1%, the balance of the alloy being substantially all iron. An alloy within this range which has been found particularly useful contains about .70% carbon, about 3% chromium, about 3% nickel and about 8% molybdenum.

As previously stated, the alloy is especially characterized by the fact that its hardness in the "as-cast" or deposited state, decreases with increasing carbon content, the hardness varying from about 60 to about 40 Rockwell C, and substantially in direct proportion to the increase in carbon. This variation in hardness is due to the retention, in large quantities, of austenite, due to the increase in carbon. The softer weld or facing deposits are desired more particularly in applications where cold shearing is involved. The molybdenum is effective to increase the strength of the deposit at high temperatures, while boron imparts hardness, but its principal function is to increase toughness. The boron is, however, not an essential ingredient.

I claim:
1. A ferrous alloy particularly adapted for hard facing purposes, said alloy containing carbon in amounts of from about .50% to about 1.25%, chromium and nickel in amounts of from about 2% to about 7% of each, and molybdenum in amounts of from about 5% to about 10%, the balance of the alloy being substantially all iron, said alloy being characterized by the fact that its hardness decreases as the carbon increases.

2. A ferrous alloy particularly adapted for hard facing purposes, said alloy containing carbon in amounts of from about .50% to about 1.25%, chromium and nickel in amounts of from about 2% to about 7% of each, molybdenum in amounts of from about 5% to about 10%, and boron in effective amounts up to about 1%, the balance of the alloy being substantially all iron, said alloy being characterized by the fact that its hardness decreases as the carbon increases.

3. A ferrous alloy particularly adapted for hard facing purposes, said alloy containing about .70% carbon, about 3% chromium, about 3% nickel, and about 8% molybdenum, the balance of the alloy being substantially all iron.

4. A weld rod for hard facing purposes, said rod comprising a ferrous alloy containing carbon in amounts of from about .30% to about 1.50%, chromium and nickel in amounts of from about 2% to about 7% of each, and molybdenum in amounts of from about 5% to about 10%.

5. A weld rod for hard facing purposes, said rod comprising a ferrous alloy containing carbon in amounts of from about .30% to about 1.50%, chromium and nickel in amounts of from about 2% to about 7% of each, molybdenum in amounts of from about 5% to about 10%, and boron in effective amounts up to about 1%.

6. A weld rod for hard facing purposes, said rod comprising a ferrous alloy containing about .70% carbon, about 3% chromium, about 3% nickel, and about 8% molybdenum.

7. An article adapted for cutting or forming operations, said article having a facing thereon comprising a ferrous alloy containing carbon in amounts of from about .50% to about 1.25%, chromium and nickel in amounts of from about 2% to about 7% of each, and molybdenum in amounts of from about 5% to about 10%, the balance of the alloy being substantially all iron, said facing being characterized by the fact that its hardness decreases as the carbon increases.

8. An article adapted for cutting or forming operations, said article having a facing thereon comprising a ferrous alloy containing carbon in amounts of from about .50% to about 1.25%, chromium and nickel in amounts of from about 2% to about 7% of each, molybdenum in amounts of from about 5% to about 10%, and boron in effective amounts up to about 1%, the balance of the alloy being substantially all iron, said facing being characterized by the fact that its hardness decreases as the carbon increases.

9. An article adapted for cutting or forming operations, said article having a facing thereon comprising a ferrous alloy containing about .70% carbon, about 3% chromium, about 3% nickel, and about 8% molybdenum, the balance of the alloy being substantially all iron.

ARTHUR T. CAPE.